United States Patent [19]

Keusch

[11] Patent Number: 5,289,860
[45] Date of Patent: Mar. 1, 1994

[54] BORING MACHINE, PARTICULARLY FOR WOODWORKING

[75] Inventor: Siegfried Keusch, Plochingen, Fed. Rep. of Germany

[73] Assignee: REICH Spezialmaschinen GmbH, Nürtingen, Fed. Rep. of Germany

[21] Appl. No.: 940,100

[22] Filed: Sep. 3, 1992

[30] Foreign Application Priority Data

Sep. 6, 1991 [DE] Fed. Rep. of Germany .... 4129743.1

[51] Int. Cl.5 ............................................. B27C 3/00
[52] U.S. Cl. ................................... 144/92; 83/467.1; 144/1 A; 408/35; 408/52; 408/91; 269/303; 269/315
[58] Field of Search ................... 83/467.1; 269/55, 56, 269/87, 303, 315; 144/1 A, 3 E, 92, 93 R, 96; 408/35, 43, 49, 50, 52, 87, 91, 95

[56] References Cited

U.S. PATENT DOCUMENTS

| 1,625,116 | 4/1927 | Fish | 408/49 |
| 3,302,494 | 2/1967 | Taysom et al. | 144/93 R |
| 3,396,493 | 9/1968 | Irish | 408/91 |
| 4,190,938 | 3/1980 | Hillmann | 408/35 |

Primary Examiner—W. Donald Bray
Attorney, Agent, or Firm—W. Thad Adams, III

[57] ABSTRACT

The invention relates to a boring machine, particularly for woodworking, for boring rows of holes and structural bores in plate-shaped workpieces such as cabinet sidewalls, cabinet doors, etc., with a machine frame having a workpiece holder and an adjustable multi-spindle boring assembly arranged over the workpiece holder, a fixed, longitudinally oriented workpiece stop being mounted on the back of the workpiece holder, and which has a stop fixture consisting of stop rails aligned parallel to and projecting laterally at the longitudinal sides of the workpiece holder and whereat adjustable and lockable stop receivers can be introduced into the stop rails, the stop receivers receiving spring-loaded stop platelets, which project at the surface of the workpiece holding fixture, but which can be brought into a pushed back position. The operation of the boring machine is simplified and facilitated in that the multi-spindle boring assembly is adjustable and lockable vertically to the longitudinal sides of the workpiece holder, that "n" stop strips with holding fixtures for stop receivers are combined into a stop roller with n angles in the cross-section, that the stop roller can be brought into n angular positions below the workpiece holder, whereby the stop platelets of the stop rail facing an opening in the workpiece holder project through this opening.

6 Claims, 3 Drawing Sheets

BORING MACHINE, PARTICULARLY FOR WOODWORKING

TECHNICAL FIELD AND BACKGROUND OF THE INVENTION

The invention relates to a boring machine, particularly for woodworking, for boring series of holes and structural bores in plate-shaped workpieces such as cabinet sidewalls, cabinet doors, etc., with a machine frame having a workpiece holder and an adjustable multi-spindle boring assembly arranged over the workpiece holder, a fixed, longitudinally oriented workpiece stop being mounted on the back of the workpiece holder, and which has a stop fixture consisting of stop rails aligned parallel to and projecting laterally at the longitudinal sides of the workpiece holder and whereat adjustable and lockable stop receivers can be introduced into the stop rails, the stop receivers receiving spring-loaded stop platelets, which project at the surface of the workpiece holding fixture, but which can be brought into a pushed back position.

A boring machine of this type is known through DE 33 38 943. In this known boring machine, the stop receivers with the stop platelets are set and locked in the stop rails for the desired boring pattern of the workpiece. The two stop rails are arranged in alignment behind one another and are adjusted in opposite directions by means of adjusting spindles. The operation of the boring machine is quite difficult for a complicated and irregular boring pattern, particularly because the operational so changes as a function of the boring pattern.

It is the object of the invention to provide a boring machine of the type mentioned at the outset, which can be used to incorporate the most varied of multi-row boring patterns of a workpiece into the workpiece with simple operations.

The invention achieves this object in that "n" stop strips with holding fixtures for stop receivers are combined into a stop roller with angles in the cross-section, that the stop roller can be brought into angular positions below the workpiece holder, whereby the stop platelets of the stop rail facing an opening in the workpiece holder project through this opening, and in that the stop roller assumes a defined position with respect to the workpiece holder independently of its angular position in the axial direction.

The stop roller with "n" stop rails permits presetting of "n" rows of hole grids, the adjustment requiring only setting the stop roller in the correct angular position and bringing the multi-spindle boring assembly to the correct spindle and the correct distance from the fixed rear-side stop of the workpiece holder.

In a preferred development, the stop rails have an undercut receiving groove and are combined into a one-piece shape section to reduce component requirements and to simplify the locking of the stop receiver; this is achieved in a simple way in that the stop receivers can be fastened in any position by means of a screw and a nut on the stop roller guided in the receiving groove of the stop rail.

If provision is made in a development for removable mounting of the stop roller in the machine frame, a stop roller with a setting for quite specific bore pattern can be used again and again for such workpieces without further setting procedures. In addition, use can be made of a number of stop rollers, which have a fixed adjustment for different boring patterns.

The adjustment of the stop roller in different angular positions is simplified in that a rotating attachment is assigned to the stop roller, which can be used to turn the stop roller in "n" angle steps in 360 degrees.

For setting the stop receivers with the stop platelets, one advantageous development is characterized in that the edge of the opening facing the forward longitudinal edge of the workpiece holder is designed at the top as a graduated scale or is connected with a graduated scale.

The operation of the boring machine is also facilitated in that the spindles of the multi-spindle boring assembly bear markings that correspond to markings on the stop rails.

The workpiece holder does not impede rotation of the stop roller if the opening in the workpiece holder flares out toward the underside of the workpiece holder, and if the edges of the opening bring the stop platelets into the pushed back position on passing the opening when the stop roller is turned counter to the swiveling direction of the stop platelets.

BRIEF DESCRIPTION OF THE DRAWINGS

The invention is explained in more detail with an example embodiment illustrated in the drawings.

DESCRIPTION OF THE PREFERRED EMBODIMENT AND BEST MODE

Figure 1:
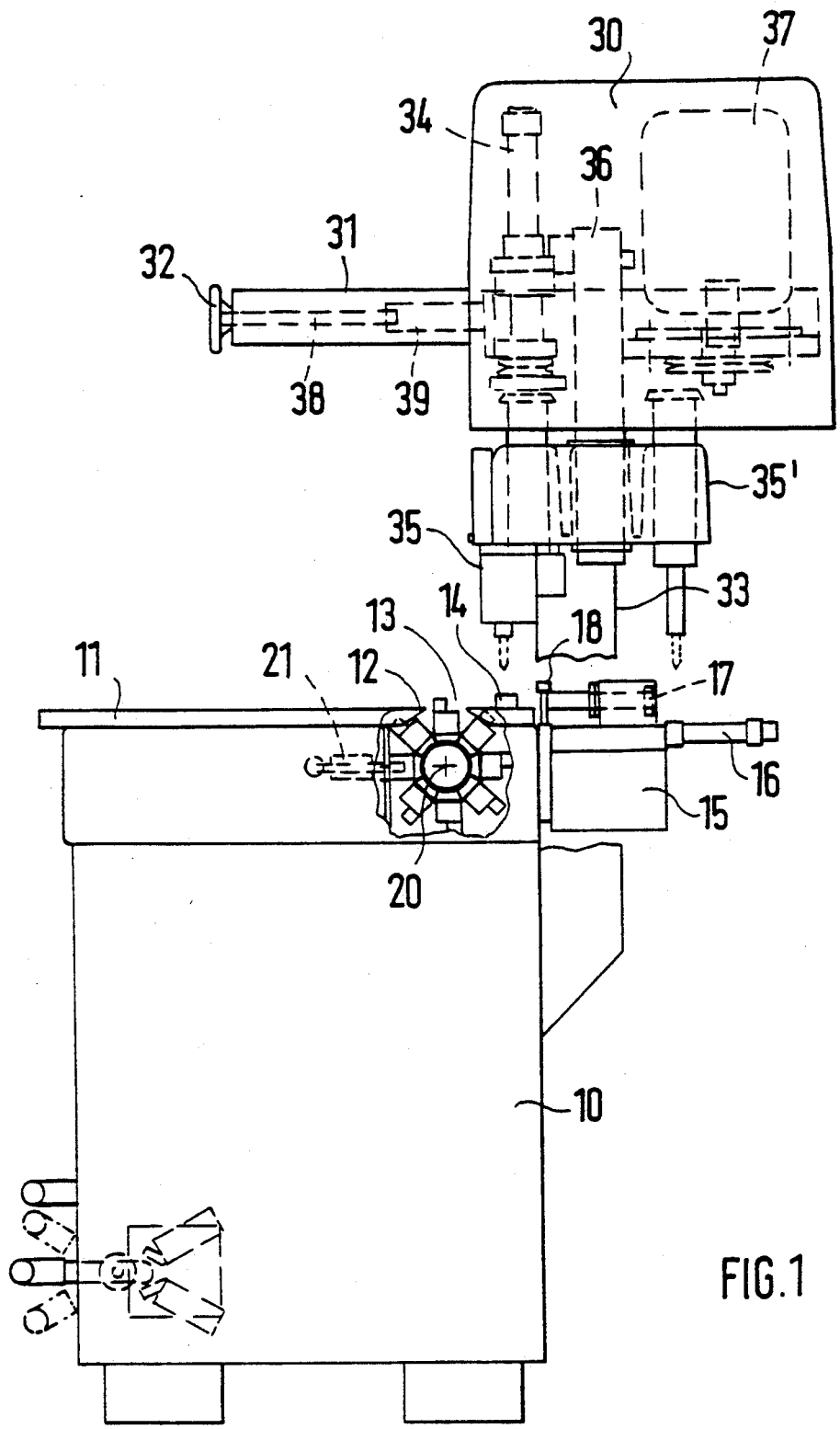
FIG. 1 is a schematic side view of a boring machine with a stop roller.
Figure 2:
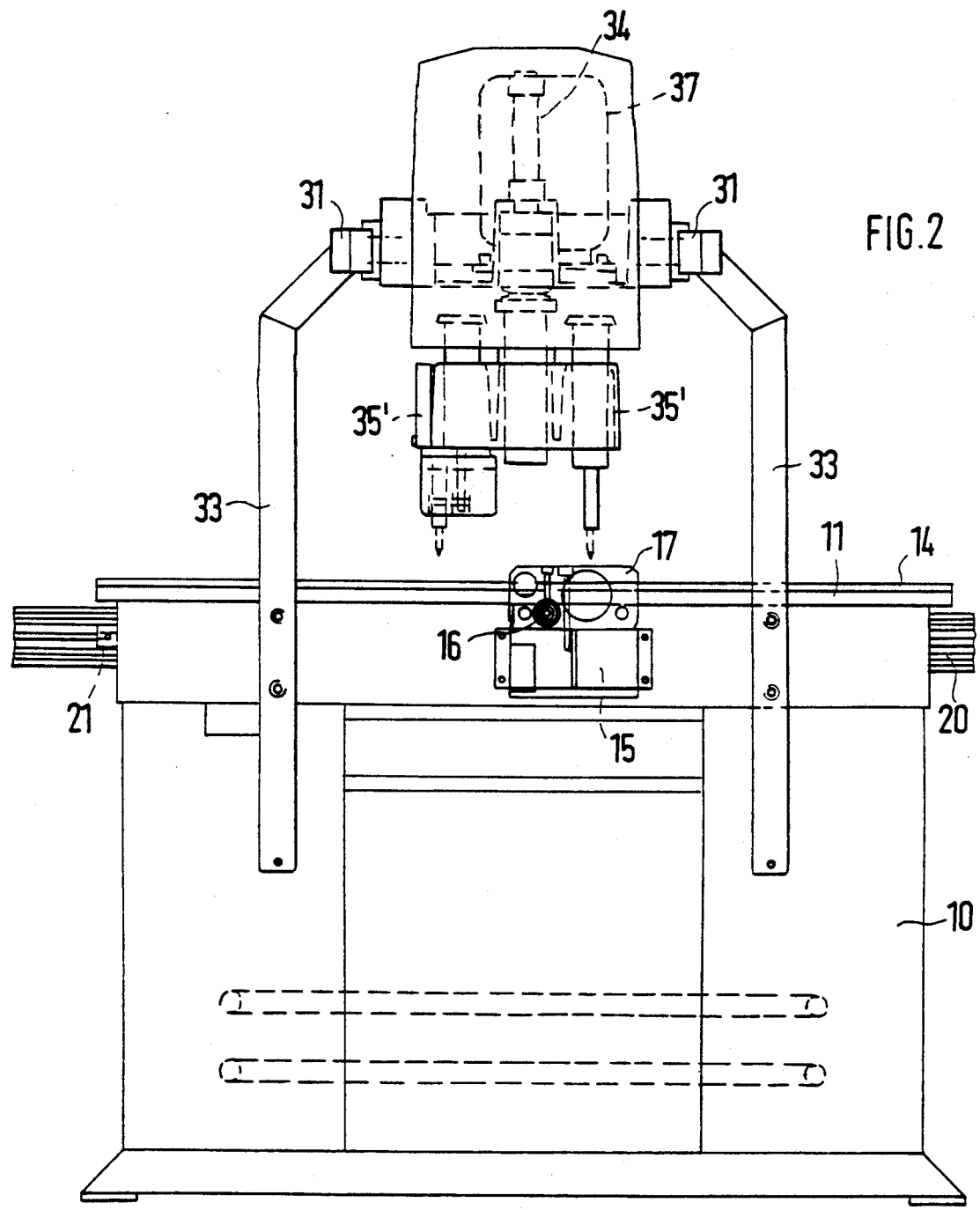
FIG. 2 is a schematic view of the rear side of the boring machine according to FIG. 1.

As the views in FIG. 1 and 2 show, the boring machine has a known type of machine frame 10, which is closed off at the top with a plate as workpiece holder 11. Only those details will be explained that are significant for understanding the invention. The workpiece holder 11 has a slot-shaped opening 13 running parallel to the longitudinal sides. A graduated scale 12 is introduced or mounted at the top of the edge of the opening 13 facing the forward side of the workpiece holder 11. A fixed, longitudinally oriented workpiece stop 14 is mounted following the rear edge of the opening 13. Arranged in the machine frame 10 below the opening 13 is a stop fixture with a rotating and removable mounting. This stop fixture is designed as a stop roller 20, as FIG. 3 shows in more detail and which will be explained in more detail later.

A horizontal boring assembly 15 is mounted in a fixed arrangement on the rear side of the machine frame 10. This horizontal boring assembly 15 has a tool carrier 17, which can be displaced in the direction of the workpiece stop 14 by means of an adjuster 16 designed as a pneumatic cylinder, for example, in order to bring bores to the face of the workpiece adjoining the workpiece stop 14. The tool carrier 17 of the horizontal boring assembly 15 can be displaced vertically to a limited extent with the operating element 18 in order to allow a change in the height of the bores for workpieces with different thicknesses.

The multi-spindle boring assembly 30 is mounted over the workpiece holder 11 on two uprights 33, and is adjustably guided and locked on two horizontal guides 31 running vertically to the longitudinal edges of the workpiece holder 11 for setting the distance of the bore from the workpiece stop 14. The adjustment of the multi-spindle boring assembly 30 can be carried out with a hand wheel 32 from the forward side of the boring machine. The hand wheel 32 is connected with an adjusting spindle 38, which can be adjusted in a threaded holding fixture 39 of the multi-spindle boring assembly 30 and, above this, adjusts the multi-spindle boring assembly 30 as a slide on the horizontal guides 31. The multi-spindle boring assembly 30 has a number of rotatable spindles 35 and 36', whereby the spindle 35 in the starting position shown in FIG. 1 brought into the working position is or can be directed toward with the axis toward the fixed workpiece stop 14. The view according to FIG. 2 does not show the spindle 35 in the working position and directed toward the center axis of the adjuster 34, which adjusts the spindle 35 vertically. For driving the spindle 35, a drive motor 35 is provided, which rotates the spindle 35 with a drive coupling 36 of a known type. The structure and control of the spindles 35, 35' and of the multi-spindle boring assembly 30 are not significant for the invention and can be designed in different ways.

Figure 3:
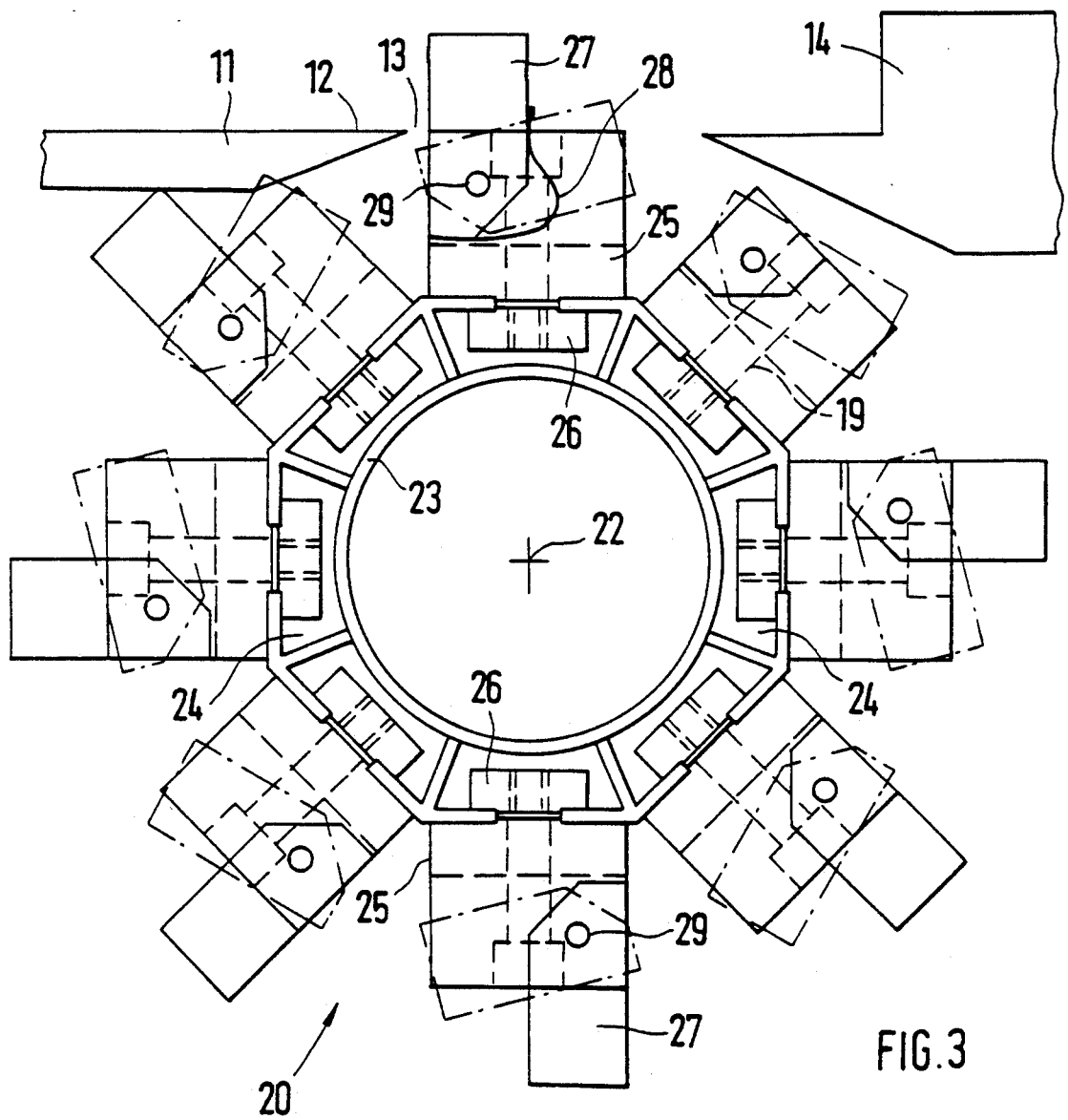
FIG. 3 is an enlarged view of the end face of the stop roller used in the boring machine according to FIG. 1 and 2.

The essential element of the invention is the stop roller 20 according to FIG. 3, which is incorporated into the machine frame 10 under the opening 13 so that, depending on the angular position of the stop roller 20, stop plates 27 of a stop rail 24 of the stop roller 20 project through the opening 13 and protrude at the top side of the workpiece holder 11.

As FIG. 3 shows, example embodiment has eight stop rails 24, which form an undercut, continuous receiving groove, are combined into a one-piece, octagonal shaped member 23. The length of the shaped member 23 is governed by the dimensions of the work pieces to be processed and can exceed the longitudinal dimension of the workpiece holder 11. The stop roller 20 extends to the surface of the workpiece holder and is moveable between workpiece holding and workpiece release positions.

The mounting of the stop roller 20 in the machine frame 10 is always such that it assumes a defined axial position with respect to the workpiece holder 11. The stop roller 20 can be brought into eight angular positions with respect to the workpiece holder 11, so that each stop rail 24 can be adjusted to face the opening 13. The stop roller 20 can also be rotatably mounted and rotated with a rotator 21 in steps of 360/8=45 degrees, so that the stop rails 24 face the opening 13 one after the other.

Stop roller 20 is removably mounted. Stop rollers 20 with fixed setting can then be used as desired for certain workpieces.

A row of stop receivers 25 are secured in the receiving grooves of the stop rails 24, depending on the boring pattern, their intervals determining the position of the bores in a row of the boring pattern.

The stop receivers 25 are to be secured at any points of the stop rails 24 by means of screws 19 and nuts 26. The stop receivers 25 have swivel-mounted stop plates 27, as the swivel axis 29 shows, and can swivel only in one direction against the action of a spring 28. The stop plates 27 form a series of stops in the opening 13 to which the workpiece can be brought with the facing front end. The unused stop plates 27 are swivelled clockwise as shown in FIG. 3, so that they are swivelled successively into the opening 13. Only the stop plate 27 used determines the distance of the bore from the adjacent front end of the workpiece, since the spindle 35 of the multi-spindle boring assembly 30 always assumes a defined position in the axial direction of the stop rails 24 and, vertically thereto, is set with respect to the distance of the row of bores to the front end of the workpiece adjacent to the fixed workpiece stop 14. If placing of the workpiece on the last stop platelet 27 is started at one end of the stop rail 24, and the following stop platelets of the same stop rail 24 are used one after the other, then the row of bores can be made with the tool held in the spindle 35 in accordance with the bore pattern desired and preset by the positions of the stop plates 27 in the stop rail 24.

For the next row of bores in the bore pattern, another stop rail 24 with suitably set stop platelets 27 is used, and the multi-spindle boring assembly 30 is adjusted to the corresponding distance of the row of bores from the front side of the workpiece adjacent to the fixed workpiece stop 14. The procedure of the sequential use of the stop platelets 27 to determine the position of the bores corresponds again. Eight rows of bores can be preset with the stop roller 20 according to FIG. 3, the rows can then also be assigned different spindles. The recommendation is then that the same markings be applied to the stop rails 24 and the spindles 35 and 35', which will facilitate assignment for operating of the boring machine. A row of bores can also be assigned a number of stop rails 24 in order to be able to work together with a number of spindles 35 and 35'. For example, a row can have two different bores and, with the stop platelets 27, a stop rail 24 presets the positions for the first bores with the first spindle 35, while the second stop rail 24 with its stop platelets 27 presets the positions for the second unlike bores, which are then made with a second spindle 35' and the other tool secured therein.

If the stop roller 20 is mounted to pivot in the machine frame 10, then the turning direction of the stop roller 20 is opposite the slewing direction of the stop plates 27, so that the stop platelets 27 can be brought, with the turning of the stop roller 20, through the edges of the opening 13 into the pushed back position in order to pass the opening 13 in the workpiece holder 11, as can be seen in FIG. 3.

The number of the stop rails 24 of the stop roller 20 can also be more or less. The only important thing is that the shape section 23 always be designed as a regular n-gon ((polygon with a given number of angles)) and that the rotator carry out the corresponding angular steps.

The adjustment of the stop receiver 25 with the stop plates 27 can also be carried out in the position of the stop roller 20 used. The graduated scale 12 is used for this purpose, being incorporated into or mounted on the workpiece holder 11. The opening 13 in the workpiece holder 11 has a width that is greater than the length of the stop plates 27 so that the stop plates 27 not used and covered by the workpiece can be slewed into the opening 13.

I claim:
1. A boring machine, adapted for boring rows of holes and structural bores in flat workpieces such as cabinet sidewalls, cabinet doors, and the like, comprising:
   (a) a machine frame;
   (b) a workpiece holder carried by the machine frame;
   (c) an adjustable multi-spindle boring assembly carried by the machine frame and positioned over the workpiece holder;

(d) a fixed, longitudinally oriented workpiece stop mounted on the back of the workpiece holder, and including a stop fixture comprising a plurality of stop rails aligned parallel to and projecting laterally at the longitudinal sides of the workpiece holder;

(e) a plurality adjustable and lockable stop receivers for being positioned on the stop rails, the stop receivers including spring-loaded stop plates which project at the surface of the workpiece holder and are moveable between workpiece holding and workpiece release positions, (f) a plurality of stop strips with receiving fixtures for said stop receivers being combined into a stop roller with a like plurality of angles in cross-section whereby the stop roller can be brought under the workpiece holder in a like plurality of angular positions; and (g) said stop plates of the stop rail facing an opening in the workpiece holder and projecting through said opening and protruding at the surface of the workpiece holder and assuming a defined position relative to the workpiece holder in the axial direction.

2. A boring machine as claimed in claim 1, wherein the stop rails have an undercut receiving groove and are combined into a one-piece shaped section with a like plurality of angles.

3. A boring machine as claimed in claim 1 or 2, characterized in that the stop receivers include securing means for securing the stop receivers in any position on the stop roller.

4. A boring machine as claimed in claim 3, wherein the stop roller is removably mounted in the machine frame.

5. A boring machine as claimed in claim 4, wherein the stop roller is assigned a rotator with which the stop roller (20) can be rotated 360 degrees in a predetermined plurality of angular steps.

6. A boring machine as claimed in claim 5, wherein the edge of said opening facing the forward longitudinal edge of the workpiece holder includes a graduated scale.

* * * * *